Patented May 31, 1932

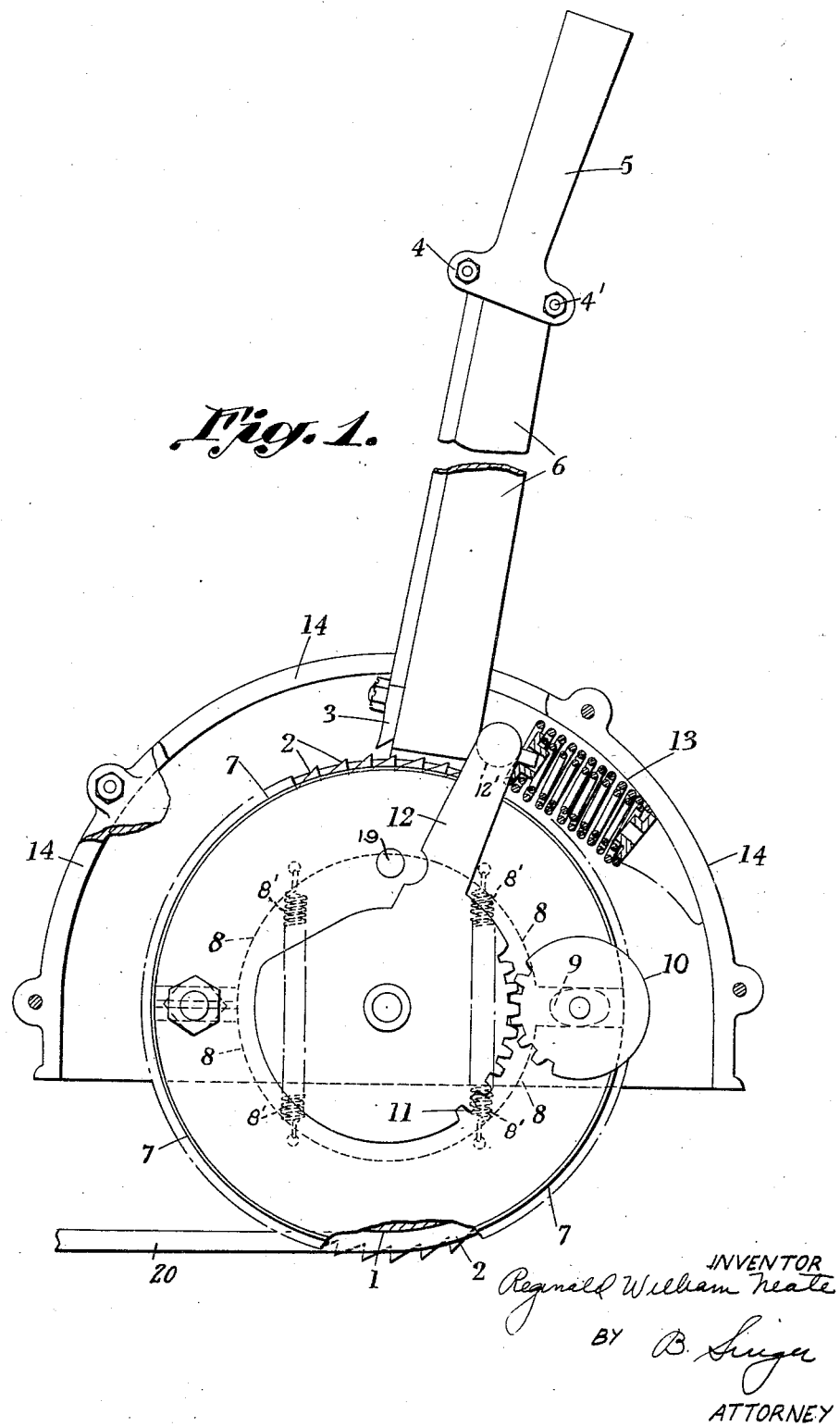

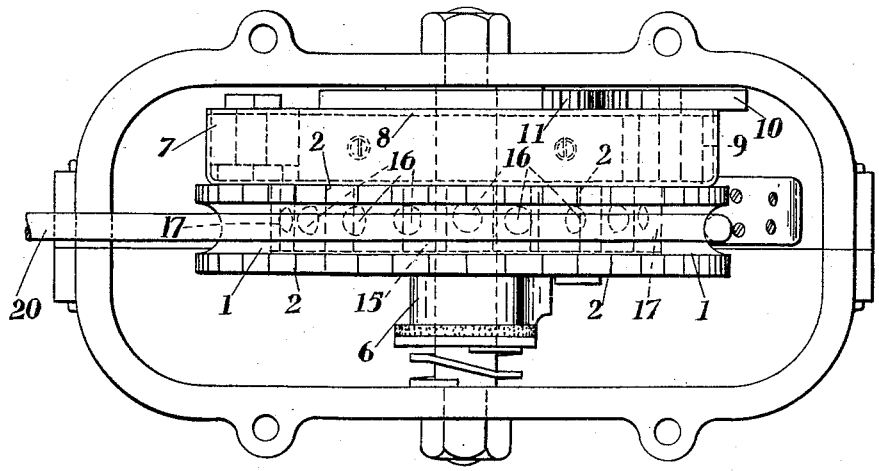
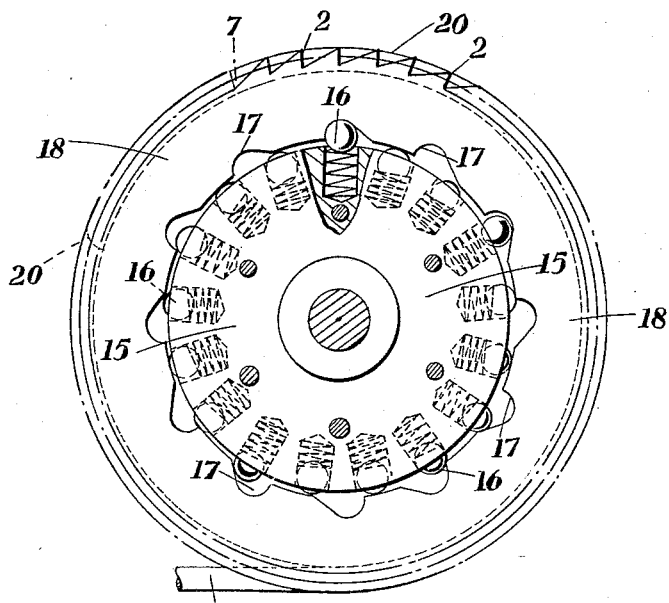

1,861,131

UNITED STATES PATENT OFFICE

REGINALD WILLIAM NEATE, OF KINGSTON-ON-THAMES, ENGLAND

BRAKE FOR TRAILER VEHICLES

Application filed July 7, 1930, Serial No. 466,284, and in Great Britain July 10, 1929.

This invention relates to improvements in or connected with brakes for vehicles, particularly to means for applying and releasing the brakes of trailer vehicles.

In braking vehicles with trailer it is of the greatest importance that the brakes for the trailers should be applied instantly should an emergency arise and, in order that this may be possible, the cable connecting the vehicles should be kept taut. For this purpose I have previously proposed to construct a device operable from the tractor for applying the brake on a trailer by means of a cable connected to the trailer brake and wrapped round a drum having a spring associated therewith for taking up slack in the cable. The drum has ratchet teeth adapted to be engaged by a pawl, detent or the like on the control lever. Thus the cable cannot become slack and the brakes come into operation immediately the cable is wound further round the drum or the like on the control lever. A second pawl, detent or the like is provided to prevent reverse rotation of the drum when the brakes are applied, and means are provided operated by reverse movement of the control lever or independently for disengaging this retaining pawl to release the drum and to take off the brake. Means are of course provided for preventing lengthening or shortening of the connecting cable due to alteration of the distance between the vehicles when turning corners and these means preferably comprise Bowden casings for one or more parts of the cable.

A device as above referred to is open to the objection that it is impossible partially to release the brakes when once they have been applied and this has been found sometimes to be a disadvantage, particularly in the case of a heavy trailer hauled by a light tractor. One of the objects of the present invention is to overcome this disadvantage.

Brake controlling mechanism according to the present invention includes a rotary drum, movement of which actuates the brake or brakes and means for moving said drum and is characterized in that the drum is normally prevented from turning in a brake-releasing direction by virtue of the provision of a one-way clutch, one member of which is coupled to the drum and the other member of which is associated with frictional restraining means, and that means are provided whereby said frictional restraining means may be wholly or partially released at will. If desired I may also provide positive means for preventing reverse rotation of the drum controlling the trailer brakes and in such cases said positive means are preferably freed upon and by the freeing operation of the frictional restraining means.

The aforesaid frictional restraining means preferably comprise a brake operating upon a drum connected to the drum controlling the trailer brakes through the medium of a one-way clutch, said brake being adapted to be retained normally in its "on" position by a spring for example engaging the control arm of said brakes. The drum controlling the trailer brake may be moved through any suitable lever having means for engaging the drum; thus said lever may have a pawl adapted to engage teeth on the periphery of the control drum and it may be adapted to be moved towards the operator for applying the brakes and away for releasing them or vice versa. The above mentioned subsidiary positive means for preventing reverse rotation may consist of a detent such as a pawl, spring or gravity controlled adapted to engage the aforesaid teeth on the control drum.

If desired means may be incorporated for resisting the gathering of any backlash in the cable although owing to the frictional restraining means normally applied to the drum it will not generally be found necessary to incorporate the spring applied to the drum in my earlier invention hereinbefore referred to.

In order that my invention may be well understood, I will now describe by way of example one embodiment thereof with reference to the accompanying drawing, in which the figure shows the brake control in side part sectional elevation.

Referring to the figure, the brake cable 20 is connected to the drum 1 having a plurality of ratchet teeth 2 formed on its periphery. Said teeth are adapted to be engaged by a pawl 3 controlled by a bell-crank lever 4, one limb 5 of which forms a handle on top of the control lever 6. By pulling the handle 5 to apply the brakes the bell crank lever is slightly rotated about its pivotal support 4' on the control lever to cause the operating pawl to engage the teeth on the drum 1 after which further movement of the handle causes the control lever to move as a whole so rotating the drum 1.

The drum 1 engages a second drum 7 through a one way clutch, thus in the example illustrated the hub or cage 15 is secured to the drum 7 and carries the balls 16 engaging the slots 17 in the ring 18. Said ring 18 may be part of or be secured to the drum 1 so that while such drum 1 is free to be rotated in an anti-clockwise direction in Figure 3, it cannot turn in a clockwise direction until such time as the cage 15 and the drum 7 are also free to rotate therewith. Said drum 7 is normally restrained in a stationary condition by means of a brake and the balls 16 are spaced at close intervals so that even though the hub 15 be caused to turn through a small angle it will be prevented from returning to its initial position and so rendering it possible to make fine adjustments in the position of the control drum 1.

In the case illustrated the brake associated with the drum 7 is of the internal expanding kind and it comprises two shoes 8 controlled by a cam 9. The cam 9 is mounted on a spindle to which is also fitted a toothed sector 10 engaging a second toothed sector 11 having an operating lever 12. The lever 12 is normally urged in its brake expanding direction by means of the double compression spring 13. A stop diagrammatically indicated by the circle 19 in Figure 1 is carried by the side of the casing shown removed in that figure and serves to determine the limit position of the lever 12 in a brake applying direction. The aforesaid lever 6 is adapted to engage the tail 12' of the lever 12 near the end of its movement in a brake-releasing direction so that the shoes 8 may be released by the desired amount. Tension springs 8' are provided for urging the shoes 8 together when freed by the cam 9.

In operation the device works as follows:—If it is desired to apply the trailer brake the operator works the control handle 5 in the brake-applying direction and if the brakes cannot be applied sufficiently with one stroke of the handle it may be oscillated the requisite number of times, care being taken, however, not to move the lever into its limit forward position or else the brake will be freed.

When it is desired partially to release the brakes the operator moves the control handle 5 to its limit position but only for a very short period; in practice it is generally found that a series of short taps provides the best method of partially releasing the brake. Each tap momentarily frees the friction brake by virtue of engaging the lever 12. When it is desired wholly to release the brakes the control handle or lever is moved into its limit position and is held there until such time as the brake drum has rotated to its limit position.

From the foregoing it will be apparent that the present invention provides a very simple and efficient trailer brake device operable from a single lever.

Whilst I have hereinbefore given one example of a device according to the present invention, I wish it to be understood that the particular details and arrangement of parts may be varied or modified without departing from the spirit and scope thereof; thus for example any suitable positive retaining means may be applied to the drum controlling the trailer brakes and the frictional retaining means may be applied thereto in any suitable way.

I claim:

1. Brake controlling mechanism including a rotary drum movement of which operates the brake mechanism and means for moving said drum, in which the drum is free to be rotated in a brake applying direction but is normally prevented from rotating in a brake releasing direction by means of a friction brake, said friction brake being freed at will by reverse movement of the member operating the rotary drum.

2. Means for controlling brake mechanism comprising a rotary drum, a lever having ratchet engagement with said drum for rotating it in a brake applying direction, a brake restrained member having engagement with said drum through a one-way clutch for normally preventing reverse rotation of the drum and means for releasing said brake restrained member at will.

3. Means for controlling brake mechanism comprising a rotary drum, a lever having ratchet engagement with said drum for rotating it in a brake applying direction, a brake restrained member having engagement with said drum through a one-way clutch and means for releasing said brake restrained member, said latter means being operated by the lever controlling the rotary drum.

4. Means for controlling brake mechanism comprising a rotary drum, ratchet teeth on said drum, a rocking lever carrying a pawl engaging said ratchet teeth and frictional means for preventing reverse rotation of said rotary drum, said latter means being freed by reverse movement of the rocking lever controlling the rotary drum.

5. Brake control mechanism comprising a rotary drum, an operating lever having a pawl engaging ratchet teeth on said drum for rotating it in a brake applying direction, a member mounted for rotation but normally prevented from moving by application of a friction brake, a one-way clutch connection between said brake and said drum permitting movement of said drum in a brake applying direction but normally preventing movement in a brake releasing direction and control means for said friction brake, said control means being normally spring urged into operative position and moved at will into brake releasing position by reverse movement of the operating lever controlling the rotary drum.

6. Brake control mechanism comprising a rotary drum, an operating lever having ratchet engagement with said drum for rotating it in a brake applying direction, spring applied frictional means for normally preventing reverse movement of said drum and means controlled by reverse movement of said operating lever for releasing said spring applied restraining means.

7. Brake control mechanism comprising a rotary drum, an operating lever having ratchet engagement with said drum for rotating it in a brake applying direction, spring applied frictional means operating through a one-way clutch for normally preventing reverse movement of said drum and means controlled by reverse movement of said operating lever for releasing said spring-applied restraining means.

8. Brake control mechanism comprising a rotary drum, an operating lever having ratchet engagement with said drum for rotating it in a brake applying direction, a member connected with said drum through a one-way clutch permitting relative movement between said parts when the drum is moved in a brake applying direction, an internal expanding brake applied to said member, spring actuated mechanism for normally maintaining said internal expanding brake in operated condition, said mechanism being urged against the action of the spring into a brake releasing condition by reverse movement of the aforesaid operating lever.

9. Brake control mechanism comprising a rotary drum, an operating lever having ratchet engagement with said drum for moving it in a brake applying direction, a member connected with said drum through a one-way clutch permitting relative movement between said drum and member when the drum is moved in a brake applying direction, a brake normally applied to said member for preventing movement of the drum in a brake releasing direction, said brake including two internal expanding shoes normally urged outwardly by a cam connected through gearing to a spring actuated lever and means comprising a member projecting from said lever and located in the path of the aforesaid operating lever for freeing said internal expanding brake upon reverse movement of said operating lever.

10. Brake control mechanism comprising a rotary drum, an operating lever having ratchet engagement with said drum for moving it in a brake applying direction, a member connected with said drum through a one-way clutch permitting relative movement between said drum and member when the drum is moved in a brake applying direction, a brake normally applied to said member for preventing movement of the drum in a brake releasing direction, said brake including two internal expanding shoes normally urged outwardly by a cam connected through gearing to a spring actuated lever and means comprising a member projecting from said lever and located in the path of the aforesaid operating lever for freeing said internal expanding brake upon reverse movement of said operating lever, the operating lever upon reverse movement first freeing said ratchet engagement and thereafter freeing the frictional means and permitting the rotary drum to move in a brake releasing direction.

REGINALD WILLIAM NEATE.